United States Patent [19]
Hino

[11] Patent Number: 5,444,986
[45] Date of Patent: Aug. 29, 1995

[54] METHOD OF PRODUCING ICE BY USING FLUORINATED PENTANE

[75] Inventor: Toshiyuki Hino, Tokyo, Japan

[73] Assignee: Kajima Corporation, Tokyo, Japan

[21] Appl. No.: 191,525

[22] Filed: Feb. 4, 1994

Related U.S. Application Data

[63] Continuation of Ser. No. 38,814, Mar. 29, 1994, abandoned.

[30] Foreign Application Priority Data

Jul. 16, 1992 [JP] Japan .................. 4-189164

[51] Int. Cl.⁶ .............. F25C 1/00; C09K 5/04
[52] U.S. Cl. ........................... 62/66; 62/533; 62/534; 252/67
[58] Field of Search ............ 252/67; 62/532, 533, 62/534, 66

[56] References Cited

U.S. PATENT DOCUMENTS

| | | | |
|---|---|---|---|
| 3,214,371 | 10/1965 | Tuwiner | 62/533 |
| 3,251,192 | 5/1966 | Rich, Jr. et al. | 62/533 |
| 3,474,635 | 10/1969 | Rowe, Jr. | 62/533 |
| 3,856,492 | 12/1974 | Klass | 62/533 |
| 4,838,039 | 6/1989 | Knodel | 62/534 |
| 4,840,652 | 6/1989 | Simon et al. | 62/534 |
| 5,196,137 | 3/1993 | Merchant | 252/172 |

FOREIGN PATENT DOCUMENTS

0431458 6/1991 European Pat. Off. .
55-131096 10/1980 Japan .
57-141986 9/1982 Japan .

OTHER PUBLICATIONS

Chemical Abstracts, vol. 98, No. 18, Acc. No. 149938t, "Equation of State in the Liquid Phase", Aften 'ev, 1982.

*Primary Examiner*—Christine Skane
*Attorney, Agent, or Firm*—Oblon, Spivak, McClelland, Maier, & Neustadt

[57] ABSTRACT

An ice making refrigerant mainly consists of at least one compound selected from the group of normal perfluoropentane, cycloperfluoropentane, isoperfluoropentane, and fluorohydropentane. The refrigerant may also consists of pentane mixed with a sufficient amount of one or more of the above compounds for making the refrigerant substantially incombustible. The refrigerant is highly resistant to combustion and free from destroying the stratospheric ozone layer. Ice is produced by mixing the refrigerant in liquid phase with water at a pressure higher than the saturation pressure $P_0$ of the refrigerant for 0° C. and then ejecting the water-refrigerant mixture into a tank at a pressure below the above saturation pressure $P_0$, so as to evaporate the refrigerant and let the water freeze by the latent heat of evaporation of the refrigerant. It is particularly suitable for air conditioning systems with heat storage in ice, direct contact type ice making plants, direct contact type water chillers, and the like.

9 Claims, 1 Drawing Sheet

METHOD OF PRODUCING ICE BY USING FLUORINATED PENTANE

This is a continuation of application Ser. No. 08/038,814, filed on Mar. 29, 1994, now abandoned.

BACKGROUND OF THE INVENTION

1. Field of the Invention

This invention relates to a refrigerant for producing ice. In particular, the invention relates to a hardly-water-soluble refrigerant for heat storage in ice (ice heat storage) of direct contact type, i.e., freezing water by bringing the refrigerant into direct contact with water and evaporating the refrigerant, which refrigerant is highly resistant to combustion and has a high chemical stability.

2. Description of the Prior Art

Recently, annual peak demand of electric power in utility systems depends on cooling load. To lower the height of such peak demand, attention has been paid to cooling system with ice heat storage by using off-peak night power, and construction of actual ice heat storage systems has been started for the purpose of cooling of buildings and industrial processes.

However, the use of such ice heat storage system has not spread so extensively, because of the present level of its cost and performance. To expand its applications, the so-called direct-contact-ice-making system has been proposed; i.e., an ice making system using such a refrigerating cycle in which a refrigerant is brought into direct contact with water to make ice. Thus, one can expect not only improvement in operational efficiency due to more efficient heat exchange through direct contact of the refrigerant with water but also cost reduction due to elimination of heat exchanger for ice making.

Various types of direct-contact-ice-making systems have been proposed, but the following conditions are commonly required to refrigerant regardless of the difference in the type of system.

(a) Insoluble to water (hardly-water-soluble)
(b) Free from hydrolysis and chemical stability even after prolonged use
(c) Free from clathration (not to form clathrate compound of refrigerant in water, or hydrate of refrigerant)

The above condition (a) is necessary to evaporate the refrigerant for fulfilling the function of the refrigerant, and if dissolved in water, it becomes difficult for the refrigerant to evaporate. The above condition (b) is necessary to use the refrigerant over a long period of time as sealed in the ice making vessel including a series of devices for refrigerating cycle. The above condition (c) is necessary, because if transformed into clathrate, refrigerant molecules lose their activity due to their inclusion in cavities of the crystal lattice of water, and hence, in order to maintain sufficient amount of active refrigerant molecules in an ice making vessel for ensuring the desired ice making ability, the amount of the refrigerant to be sealed in the ice making vessel becomes very large (10 to 30 weight percent of water therein).

Most conventional direct-contact-ice-making systems use either one of the following compounds as refrigerants satisfying the above conditions.

(1) R114 (Dichlorotetrafluoroethane)
(2) RC318 (Octafluorocyclobutane)
(3) Pentane However, the above (1) R114 has a shortcoming in that it slightly hydrolyzes and produces hydrochloric acid and the like, so that the ice making vessel is required to be made of stainless steel, resulting in a cost increase. Further, it has a risk of destroying the stratospheric ozone layer, and hence it cannot be used at the present from the standpoint of environmental protection.

The above refrigerant (2) RC318 does not contain any chlorine and free from the risk of destroying the stratospheric ozone layer. Its saturation pressure for room temperature is, however, higher than that of R114, and it requires a stronger heat storage tank as compared with R114, resulting in a cost increase. More specifically, its saturation pressure for 0° C., when co-existing with ice, is 1.3 kg/cm$^2$ (128 kPa) in terms of absolute pressure, but its saturation pressure for room temperature, e.g., 25° C., increases to 3.2 kg/cm$^2$ (314 kPa) in terms of absolute pressure. Thus, it becomes necessary to provide various reinforcements in the heat storage tank, both during construction and during operation, so as to meet safety requirements of various laws and regulations, such as "Safety Code for Pressure Tank". Since the heat storage tank must have a volume proportional to the desired magnitude of heat storage, such tank is one of the major factors affecting or increasing the cost of direct-contact-ice-making system. Hence, consideration for reducing the cost of heat storage tank is extremely important from the view point of expanding the use of direct-contact-ice-making system.

Pentane of the above refrigerant (3) is free from the risk of destroying the ozone layer, does not hydrolyze, has a low saturation pressure (below atmospheric pressure or negative relative thereto) for room temperature, and has a boiling point of 36° C. for atmospheric pressure. Thus, the cost of heat storage tank in case pentane refrigerant is used is low. However, pentane is highly combustible and safety precaution must be taken. Besides, pentane can be subject to biological activation and may be decomposed by such activation; e.g., it can become food of microorganism such as anaerobic bacteria and the like.

An object of the invention is to provide a hardly-water-soluble refrigerant for producing ice, which is substantially incombustible and free from risk of destroying the stratospheric ozone layer and evaporates while in contact with water.

SUMMARY OF THE INVENTION

The physical and chemical properties which are required for refrigerant to be used in direct-contact-ice-making system can be summarized as follows.

(a) Hardly-water-soluble
(b) Free from hydrolysis and chemically stable even after prolonged use
(c) Free from clathrate formation
(d) Free from destruction of stratospheric ozone layer
(e) Low saturation pressure for room temperature (preferably, saturation pressure of below atmospheric pressure for room temperature) and not-very-low saturation pressure for ice forming temperature (preferably, saturation pressure of below atmospheric pressure but not lower than 100 Torr (13 kPa) for 0° C.) If the saturation pressure for the ice forming temperature is below 100 Torr, it is technically difficult to form a vapor-compression type refrigeration cycle of high efficiency.
(f) Substantially incombustible (g) Free from decomposition by microorganism
(h) Free from poisonousness As to the chemical stability and incombustibility of refrigerant, the inventor noted fluorocarbon. More specifically, the bond energy between fluorine and carbon in fluorocarbon (116 Kcal/mol) is larger than the bond energy between hydrogen and carbon in hydrocarbon (99.5 Kcal/mol), and hydrocarbon has its carbon chain in most reduced state while fluorocarbon has its carbon chain in most oxidized state. Thus, fluorocarbon has a high oxidation resistance and it is incombustible. The inventor also noted the fact that various kinds of fluoropentane can be used, because even when all hydrogen atoms of the normal pentane are substituted by fluorine atoms to produce normal perfluoropentane, change in their boiling points is small; namely, boiling point of normal pentane is 36.1° C. and boiling point of normal perfluoropentane is 29.5° C.

The inventor has succeeded in developing a new refrigerant for producing ice by testing compounds resulting from replacement of hydrogen atoms of pentane with fluorine atoms, based on the outcome of prior studies concerning conventional direct-contact-ice-making system and the outcome of the inventor's own research and development concerning the above-mentioned properties of fluorocarbon.

The refrigerant for producing ice according to the invention evaporates while being in direct contact with water so as to cool and freeze the water into ice by its latent heat of evaporation. Examples of the composition of such refrigerant are as follows.

(1) Composition consisting of perfluoropentane as a major component, (2) The above composition (1) wherein the perfluoropentane is normal perfluoropentane ($nC_5F_{12}$), (3) The above composition (1) wherein the perfluoropentane is cycloperfluoropentane or isoperfluoropentane ($C_5F_{12}$), (4) Composition consisting of fluorohydropentane ($C_5F_nH_{12-n}$, $1 \leq n \leq 11$) as a major component, (5) Composition consisting of a major component including fluorohydropentane ($C_5F_nH_{12-n}$, $1 \leq n \leq 11$) and perfluoropentane, or (6) Composition consisting of pentane and such amount of fluorohydropentane ($C_5F_nH_{12-n}$, $1 \leq n \leq 11$) and/or perfluoropentane which amount is sufficient to make the refrigerant substantially incombustible.

Perfluoropentane in the above composition (1) satisfies all of the above-mentioned properties (a) through (h) required for the refrigerant of direct-contact-ice-making system. As to the configuration of carbon atoms in perfluoropentane, normal perfluoropentane ($nC_5F_{12}$) of the above composition (2) has a straight chain form, cycloperfluoropentane of the above composition (3) has a cyclic form, and isoperfluoropentane ($C_5F_{12}$) of the above composition (3) has a branched chain form. At the present, normal perfluoropentane is the easiest to obtain among the above three types of perfluoropentane. As far as properties relating to refrigerant for ice heat storage by direct-contact-ice-making are concerned, there seems to be no significant difference between cycloperfluoropentane and isoperfluoropentane, as their boiling points are nearly equal to each other.

Fluorohydropentane of the above composition (4) is a compound whose molecule has five carbon atoms, which compound is formed by partially substituting the hydrogen atoms of pentane of chain, cyclic, or branched chain configuration with fluorine atoms. The reason for substituting one to eleven hydrogen atoms of pentane molecule with fluorine atoms is in that, compound derived by substitution of at least one hydrogen atom with fluorine atom is expected to have improved level of the above properties required for the refrigerant of direct-contact-ice-making, especially incombustibility and biological non-activity. It is also expected that, with the increase of the number of fluorine atoms substituting the hydrogen atoms, the above properties required for the refrigerant are further improved. However, as to the thermodynamic characteristics of the refrigerant, such as latent heat of evaporation and the like, the more the number of hydrogen atoms is the better such thermodynamic characteristics is. It is noted that if a fairly large amount of fluorohydropentane is produced, its cost may become lower than that of perfluoropentane.

The mixture of fluorohydropentane and perfluoropentane in the above composition (5) can also be used, of course, as a refrigerant for heat storage by direct-contact-ice-making.

If a refrigerant is prepared by mixing combustible pentane with sufficient amount of fluorohydropentane and/or perfluoropentane for making the refrigerant substantially incombustible, as in the case of the above composition (6), such refrigerant can be safely used in ice heat storage by direct-contact-ice-making. The problem of decomposition of refrigerant by anaerobic bacteria can be solved by using a suitable germicide and the like.

Perfluoropentane and fluorohydropentane are derivatives of hydrocarbon having five carbon atoms in each molecule thereof, i.e., pentane. The reason why such derivatives of hydrocarbons having six or more carbon atoms are not used is in that, if one dares to use perfluorocarbon having six or more carbon atoms as refrigerant for ice heat storage by direct-contact-ice-making including change of phase, saturation pressure for water freezing point 0° C. becomes very low, for example, 80 Torr (8 kPa) or less, and the compressor in refrigeration cycle has to suck a large volume of gaseous refrigerant, so that the compressor becomes large in size, and hence both intake and discharge gas pipes of the compressor must be large, resulting in an increase of equipment cost. Further, mechanical loss of compressor and the like also increases, and it becomes difficult to work out an efficient refrigeration cycle of gas compression type.

On the other hand, the reason why perfluorocarbons and fluorohydrocarbons derived from hydrocarbons having four or less carbon atoms are not used is in that, in the case of such fluorocarbons having four or less carbon atoms, the saturation pressure for room temperature is high, and building cost of heat storage tank becomes high as explained above. Therefore, among derivatives of various hydrocarbons, fluorocarbon having five carbon atoms, i.e., fluoropentane, is most suitable for the refrigerant of direct-contact-ice-making.

It is noted that perfluorocarbon having five carbon atoms can be used as a refrigerant for refrigerating machines of centrifugal (turbo) type as a substitute of Freon R11. However, the refrigerant of the invention is to be brought into direct contact with water so as to improve the efficiency of ice heat storage by direct-contact-ice-making, and it is not a mere substitute refrigerant for refrigerating machines using Freon.

It has been known that perfluorocarbon having six or more carbon atoms can be used as an antifreeze solution or high-boiling-point heat carrier (under Registered Trademark "Fluorinert" owned by The 3M Corporation of the U.S.A. An ice heat storage system may be formed by using Fluorinert; namely, liquid Fluorinert may be cooled to about −6° C. by a regular refrigerating machine (refrigerating machine using Freon) and the cooled Fluorinert may be circulated as an insoluble brine (antifreeze liquid) while being brought into direct contact with water so as to freeze the water into ice for storing energy therein. However, such ice heat storage system uses the refrigerant only as a heat carrier for transferring sensible heat alone, and no phase transition (between gas and liquid) of the refrigerant is caused when it is in contact with water. Hence, the above ice heat storage system using Fluorinert cannot achieve the high efficiency which is available only by the use of the latent heat of evaporation of the refrigerant according to the invention.

DESCRIPTION OF THE DRAWING

For a better understanding of the invention, reference is made to the accompanying single drawing, in which.

DETAILED DESCRIPTION OF PREFERRED EMBODIMENT

Figure 1:
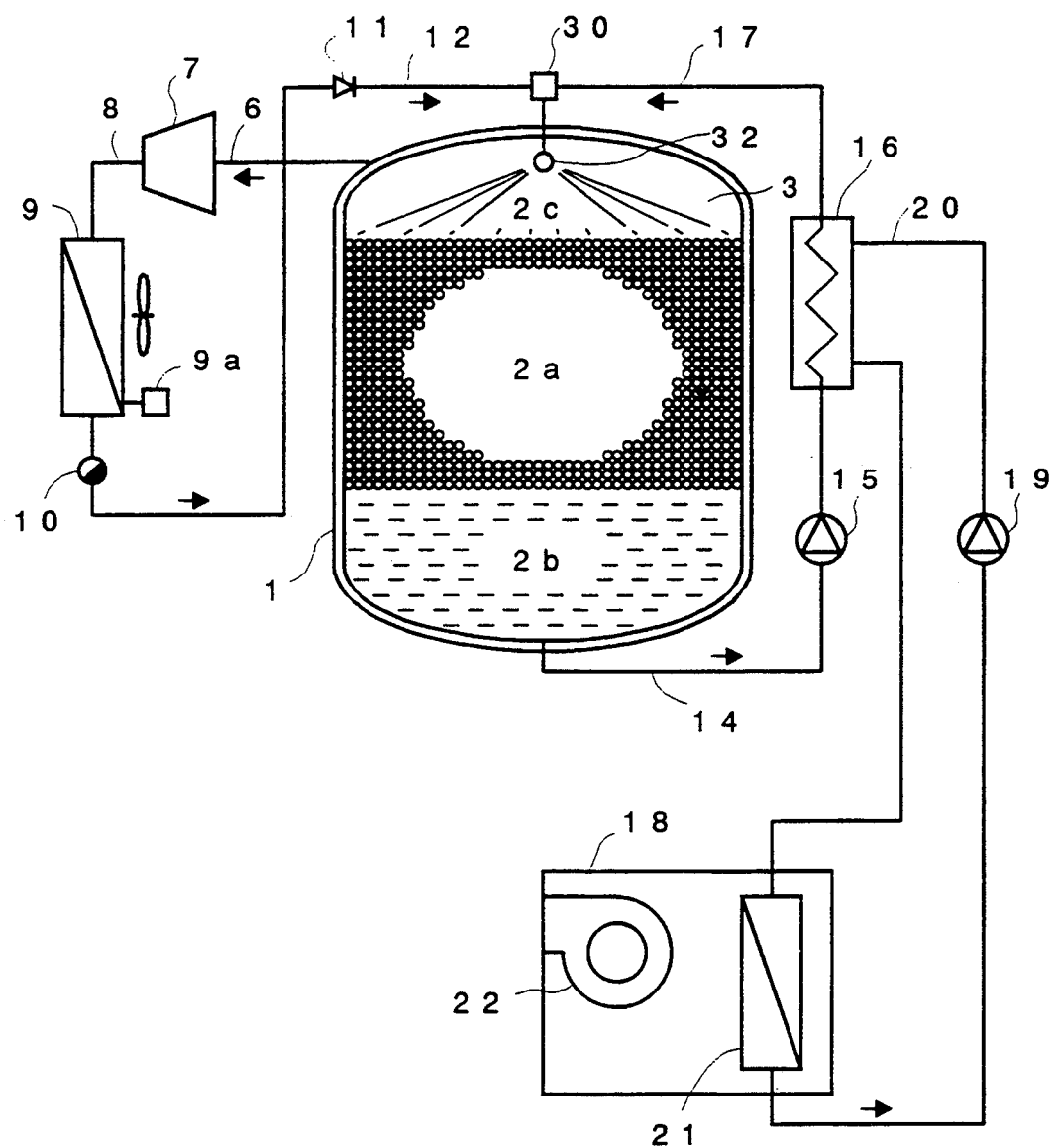
FIG. 1 is a block diagram of an embodiment of the ice heat storage system of direct contact type using a refrigerant according to the invention.

Before entering the details of preferred embodiment, the operating principle of the invention will be described with reference to FIG. 1. Deaired water and deaired refrigerant are fed into evacuated space at the top portion 3 of a water tank 1, and the refrigerant in the water tank 1 is extracted and compressed by a compressor 7 so as to be discharged to a condenser 9. After liquefied at the condenser 9, the liquid phase refrigerant is mixed with water in a mixer 30 or the nozzle 32 at a pressure sufficiently higher than saturation pressure $P_0$ of the refrigerant for 0° C. (in order to prevent water from freezing upstream of a nozzle). The resultant mixed liquid is jetted from the nozzle 32 into the space within the water tank 1 at a pressure equal to or less than the above saturation pressure $P_0$, and the refrigerant evaporates and the water is cooled and frozen by the latent heat of evaporation of the refrigerant. Thus, ice heat storage by direct-contact-ice-making is effected.

The refrigerant according to the invention is perfluoropentane with or without fluorohydropentane ($C_5F_nH_{12-n}$, $1 \leq n \leq 11$), or a mixture of pentane and such amount of fluorohydropentane ($C_5F_nH_{12-n}$, $1 \leq n \leq 11$) and/or perfluoropentane which amount is sufficient for making the mixture substantially incombustible. Thus, with the refrigerant of the invention, possibility of combustion is small and the risk of destroying the stratospheric ozone layer is scarce.

Thus, the object of the invention, i.e, to provide an ice producing refrigerant which is evaporated without possibility of destruction of the stratospheric ozone layer, is fulfilled.

FIG. 1 shows an embodiment of ice heat storing system by direct-contact-ice-making which uses a refrigerant according to the invention. A heat storage tank, or a water tank 1 is made of steel which withstands vacuum. Since the refrigerant of the invention does not hydrolyze and does not produce acid, anti-corrosion treatment is not necessarily required and the water tank 1 can be built at a low cost.

A compressor 7 of an oil free type is used to extract refrigerant from top space 3 of the water tank 1 through a refrigerant gas suction pipe 6. The reason why the oil free type compressor 7 is used is in that, if a compressor using oil for cylinder lubrication is used, such oil is discharged from the compressor 7 to its discharge refrigerant pipe 8, and such discharged oil is likely to reach the water tank 1 and remain there, resulting in accumulation of oil in the water tank 1. Once accumulated in the water tank 1, it is difficult to return such oil to the compressor 7. As the oil free compressor, recipro (reciprocating) type and screw type are available for small size, and turbo (centrifugal) type is available for large size.

A condenser 9, which receives compressed refrigerant from the compressor 7 through its discharge refrigerant gas pipe 8 for condensation thereof, can be of water cooling type using cooling water from a cooling tower or of air cooling type using fan-driven forced ventilation for heat radiation.

A gas trap 10 interrupts passage of non-condensed gaseous refrigerant and allows passage of only condensed or liquefied refrigerant. In the illustrated example, partial pressure reduction is effected here. The circulating refrigerant may contain water (small amount), and to prevent such water from freezing at the partial pressure reduction, the extent of the partial pressure reduction is limited so as to maintain the saturation temperature of the refrigerant higher than 0° C. (for instance, in case of perfluoropentane, pressure reduction to about 450 Torr). The refrigerant is then mixed with cold water from cold water return pipe 17, and the water-refrigerant mixture is jetted from a nozzle 32 into the top space 3 of the water tank 1, and depressurized to, for example, about 200 Torr in case of perfluoropentane. As a result, the saturation temperature of the refrigerant is reduced to 0° C. or lower, thereby ice is formed. The symbol 2c in the drawing indicates mixture of ice (or water) droplets and refrigerant droplets and gas produced by the jetting of water-refrigerant mixture. When the temperature of water in the water tank 1 is high, the jetted return water may not freeze immediately, and sometimes it may just cool water in the water tank 1.

A part of the jetted liquid refrigerant may not evaporate and fall into water in the water tank 1. If the refrigerant has a large number of fluorine atoms in its molecule and its specific gravity is larger than that of water, it sediments on a bottom of the water tank 1. The sedimented refrigerant is extracted from the bottom of water tank 1 together with cold water by a cold water circulating pump 15, and is delivered again to the nozzle 32 so as to be jetted together with the water, whereby the refrigerant evaporates in the top space 3 or evaporates from the surface of floating ice or from the surface or inside of water in the water tank 1. If the refrigerant has a small number of fluorine atoms in its molecule and its specific gravity is smaller than that of water, it evaporates from the floating ice or from the surface or inside of water in the water tank 1.

Cold water 2b in the bottom of the water tank 1 is extracted to a cooling water outlet pipe 14 by the cold water circulating pump 15 and sent to a cold water heat exchanger 16 and then to a cold water return pipe 17. At the end of the return pipe 17, the return cold water is mixed with the liquid refrigerant (including refrigerant gas if remained) from the gas trap 10. To ensure thorough mixing of cold water and liquid refrigerant, a mixer 30 of static type (with guide vanes and the like) or dynamic type (with rotating vanes and the like) may be used as shown in the drawing. The nozzle 32 for jetting the mixture of the refrigerant and cold water should scatter or distribute the jetted particles over a wide area, and preferably, it is of multi-nozzle (multi-hole) type or rotating nozzle type.

The ice thus produced floats at first on the top surface of water in the water tank 1, and then on top of the preceding ice layer so as to be piled thereon and form piled layers of ice. The piled layers of ice fill the water tank 1 to its bottom in a time period, depending on the size of water tank 1 and the capacity of direct-contact-ice-making system, for example, in about ten hours. The symbol 2a of the drawing indicates water-ice mixture in the intermediate portion of the water tank 1. When the water tank 1 is filled with such ice, it may be detected by a suitable means (not shown) so as to generate a signal for stopping the compressor 7.

In cooling operation (causing the ice to melt), an air conditioner 18 runs its cold water pump 19 to feed cold water from the cold water heat exchanger 16 to its air conditioning coil 21 through load piping 20. The cold water heat exchanger 16 effects heat exchange between the cold water of the air conditioner 18 and that from the water tank 1. A blower 22 blows air to the air conditioning coil 21 for cooling the air thus blown. The return water from the cold water heat exchanger 16, which is warmed by giving its cryogenic heat to the air conditioner 18, is sent to the nozzle 32 and sprayed onto the surface of the ice in the water tank 1. The warmed return water melts the ice in the water tank 1, starting from the upper surface portion thereof. Thus, the piled ice layer gradually rises in a piston-like fashion, while allowing cold water to penetrate through gaps between ice particles toward the bottom of the water tank 1. A check valve 11 in the illustrated embodiment is to prevent reverse water flow to the liquid refrigerant pipe 12 when the compressor 7 is at rest. Ice-melting operation and ice-making operation may be effected simultaneously.

In the water tank 1, both the ice-making and ice-melting are effected in a layered manner by the liquid jetted from the nozzle 32 as described above. Thus, no ice fluidizer (e.g., propylene glycol, and the like) is not required in principle, but suitable fluidizer may be added depending on the circumstances.

In the embodiment of the system for ice heat storing using perfluoropentane refrigerant, the pressure in the top space 3 of the water tank 1 under operation with ice therein is about 200 Torr. The intake pressure of the compressor 7 during operation is a little lower than the pressure in the top space 3. The discharge pressure of the compressor 7 and a condensing pressure for the refrigerant is about atmospheric pressure, although it depends on outdoor air temperature. Since most devices of the system are at low pressure (negative relative to the atmospheric pressure), it is preferable to provide an air extracting device 9a for removing air which has leaked therein from the outside.

The refrigerant according to the invention is primarily for ice heat storage, but it may be also used in water chillers. More specifically, the evaporator of water chiller (water cooling means such as turbo refrigerating machine) can be replaced with the direct-contact-ice-making means using the refrigerant of the invention, and the conventional heat exchanger of multiple pipe type may be eliminated. Thus, cost is reduced, and in addition, an improvement of efficiency can be expected by the use of direct-contact-type heat exchange between refrigerant and water. Even if water chiller produces ice inadvertently, it causes no problem. The construction of water chiller is essentially the same as in FIG. 1, and its example is not illustrated.

As hereinbefore fully described, the refrigerant according to the invention is for producing ice and particularly suitable for direct-contact-ice-making applicable to ice heat storage and the like, and uses perfluoropentane and/or fluorohydropentane which are derivatives of pentane by replacing its hydrogen atom(s) with fluorine atom(s). Thus, the following outstanding effects are achieved.

(1) Risk of fire due to combustibility of the refrigerant can be eliminated from facilities using it, such as ice heat storage systems and the like.

(2) Risk of destroying the stratospheric ozone layer by the use of refrigerant is eliminated, and it becomes possible to build ice heat storage facilities and the like which are free from such risk.

(3) No acid due to hydrolysis of refrigerant. Thus, there is no need for anti-corrosion treatment and cost for it can be saved.

(4) No need for ice fluidizer, at least in principle.

(5) Problems impeding the spread of direct-contact-ice-making for ice heat storage or the like have been dissolved; for instance, combustibility, destruction of the stratospheric ozone layer, chemical stability, clathrate formation, pressure at room temperature, resistance to micro-organism, and no poisonousness to humanity and animals. Thereby, actual use of such direct-contact-ice-making is facilitated.

What is claimed is:

1. A direct contact icemaking method characterized by being free from clathration, said method comprising bringing a hardly-water-soluble refrigerant into direct contact with water to form a water-refrigerant mixture consisting essentially of said refrigerant and water, and evaporating said refrigerant while deriving heat from said water to thereby cool said water to form ice directly from said water, said refrigerant consisting essentially of a compound or mixture of compounds selected from the group consisting of a perfluoropentane, fluorohydropentane $C_5F_nH_{12-n}$ wherein $1 \leq n \leq 11$ and mixtures thereof, said refrigerant being in liquid phase and being mixed with said water at a pressure higher than the saturation pressure $P_0$ of the refrigerant for 0° C., the evaporation being accomplished by ejecting said water-refrigerant mixture into a tank at a pressure equal to or less than the saturation pressure $P_0$, so as to evaporate the refrigerant and thereby cool the water.

2. A method of producing ice as set forth in claim 1, wherein the saturation pressure of the refrigerant for room temperature is lower than atmospheric pressure and the saturation pressure of the refrigerant for 0° C. is higher than 100 Torr but lower than atmospheric pressure.

3. A method of producing ice as set forth in claim 1, wherein said refrigerant consists essentially of a perfluoropentane and is cycloperfluoropentane or isoperfluoropentane.

4. A method of producing ice as set forth in claim 1, wherein said refrigerant consists essentially of a perfluoropentane and is normal perfluoropentane $nC_5F_{12}$.

5. A method of producing ice as set forth in claim 1, wherein said refrigerant consists essentially of a perfluoropentane $C_5F_{12}$.

6. A method of producing ice as set forth in claim 5 wherein said refrigerant is normal perfluoropentane $nC_5F_{12}$.

7. A method of producing ice as set forth in claim 1, wherein said refrigerant consists essentially of a fluorohydropentane compound of the formula $C_5F_nH_{12-n}$ wherein $1 \leq n \leq 11$.

8. A method of producing ice as set forth in claim 6, wherein the saturation pressure of the refrigerant for room temperature is lower than atmospheric pressure and the saturation pressure of the refrigerant for 0° C. is higher than 100 Torr but lower than atmospheric pressure.

9. A direct contact icemaking method characterized by being free from clathration, said method comprising bringing a hardly-water-soluble refrigerant into direct contact with water to form a water-refrigerant consisting essentially of said refrigerant and water, and evaporating said refrigerant while deriving heat from said water to thereby cool said water to form ice directly from said water, said refrigerant consisting essentially of a mixture of pentane and an amount of at least one compound selected from the group consisting of a perfluoropentane $C_5F_{12}$ and fluorohydropentane $C_5F_nH_{12-n}$ wherein $1 \leq n \leq 11$, which amount is sufficient for making the refrigerant substantially incombustible, said refrigerant being in liquid phase and being mixed with said water at a pressure higher than the saturation pressure $P_0$ of the refrigerant for 0° C., the evaporation being accomplished by ejecting said water-refrigerant mixture into a tank at a pressure equal to or less than the saturation pressure $P_0$, so as to evaporate the refrigerant and thereby cool the water.

* * * * *

UNITED STATES PATENT AND TRADEMARK OFFICE
CERTIFICATE OF CORRECTION

PATENT NO. : 5,444,986
DATED : August 29, 1995
INVENTOR(S) : Toshiyuki HINO

It is certified that error appears in the above-indentified patent and that said Letters Patent is hereby corrected as shown below:

On the title page, Item [63], the Related U.S. Application Data should read:

--Continuation of Ser. No. 38,814, Mar. 29, 1993, abandoned.--

Signed and Sealed this

Fifth Day of December, 1995

Attest:

BRUCE LEHMAN

*Attesting Officer*  *Commissioner of Patents and Trademarks*